United States Patent
Hanusch et al.

(10) Patent No.: US 9,560,673 B2
(45) Date of Patent: Jan. 31, 2017

(54) CONFIGURABLE CLEAR CHANNEL ASSESSMENT

(71) Applicant: Atmel Corporation, San Jose, CA (US)

(72) Inventors: Thomas Hanusch, Coswig (DE); Udo Walter, Dresden (DE); Jeannette Zarbock, Dresden (DE)

(73) Assignee: Atmel Corporation, San Jose, CA (US)

( * ) Notice: Subject to any disclaimer, the term of this patent is extended or adjusted under 35 U.S.C. 154(b) by 107 days.

(21) Appl. No.: 14/532,209

(22) Filed: Nov. 4, 2014

(65) Prior Publication Data
US 2016/0128070 A1    May 5, 2016

(51) Int. Cl.
| | | |
|---|---|---|
| H04W 72/04 | (2009.01) | |
| H04W 72/08 | (2009.01) | |
| H04W 74/08 | (2009.01) | |
| H04W 88/02 | (2009.01) | |

(52) U.S. Cl.
CPC ......... *H04W 74/0808* (2013.01); *H04W 88/02* (2013.01)

(58) Field of Classification Search
CPC ............. H04W 84/12; H04W 72/0446; H04W 74/0808; H04W 74/0816
USPC ................................. 370/252, 329, 338, 311
See application file for complete search history.

(56) References Cited

U.S. PATENT DOCUMENTS

| | | | |
|---|---|---|---|
| 8,705,670 B2 | 4/2014 | Ferchland et al. | |
| 2007/0286122 A1* | 12/2007 | Fonseca ................ | H04L 1/0021 370/329 |
| 2012/0106496 A1* | 5/2012 | Sakai .................... | H04W 28/18 370/329 |
| 2012/0106529 A1 | 5/2012 | Ferchland et al. | |

OTHER PUBLICATIONS

IEEE Standard for Local and Metropolitan Area Networks, Part 15,4: Low-Rate Wireless Personal Area Networks (LR-WPANs), Amendment 3: Physical Layer (PHY) Specifications for Low-Data-Rate, Wireless, Smart Metering utility Networks; IEEE Std 802.15.4g™-2012 (Amendment to IEEE Std 802.15.4™-2011) IEEE Standards Association, 252 pages (Apr. 27, 2012).
Low Power, 700/800/900MHz Transceiver for ZigBee, IEEE 802.15.4, 6LoWAN, and ISM Applications, Atmel 42002C-MCU Wireless, 212 pages (2013).
AT86FR233, Low Power, 2.4GHz Transceiver for ZigBee, RF4CE, IEEE 802.16.4, 6LoWPAN, and ISM Aplications, Preliminary Datasheet, Atmel-8351E-MCU Wireless-AT86RF233 Datasheet, 232 pages (2014).

* cited by examiner

*Primary Examiner* — Jamal Javaid
(74) *Attorney, Agent, or Firm* — Fish & Richardson P.C.

(57) ABSTRACT

An example method of assessing one more communication channels includes receiving an indication to initiate channel assessment, receiving a user-selected first set of assessment parameters, and determining whether or not the first communication channel is busy based on the first set of assessment parameters. The method also includes replacing the first set of assessment parameters with a user-selected second set of assessment parameters, and determining whether or not the second communication channel is busy based on the second set of assessment parameters.

23 Claims, 4 Drawing Sheets

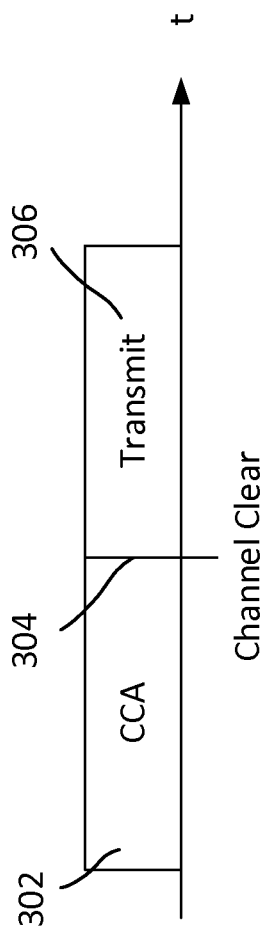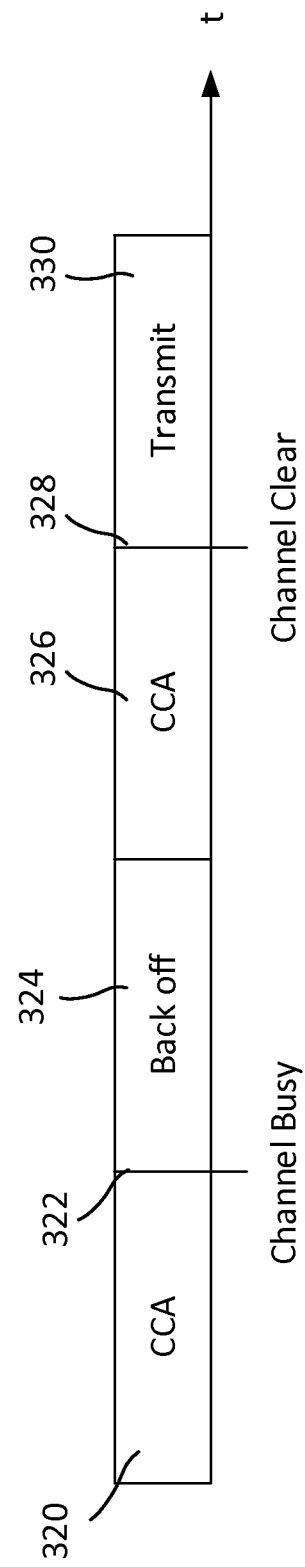

CONFIGURABLE CLEAR CHANNEL ASSESSMENT

TECHNICAL FIELD

The present disclosure relates to wireless transceivers, and more particularly to assessing the availability of a wireless communication channel.

BACKGROUND

A wireless transmitter is an electronic device that produces radio waves. As an example, a transmitter transmits information (e.g., a data) by generating a radio frequency alternating current corresponding to that information, and applying the alternating current to an antenna. When excited by this alternating current, the antenna radiates radio waves, thereby broadcasting the information into the surrounding environment. A wireless receiver is an electronic device that receives radio waves and converts the information carried by them to a usable form. As an example, a receiver receives radio waves generated by a remote transmitter, and converts the received radio waves into the original data.

A wireless transceiver is a device that includes both a transmitter and a receiver. A wireless transceiver can transmit and receive information over one or more channels. For example, a channel can be defined as a specific radio frequency or range of radio frequencies at which information can be transmitted and received.

SUMMARY

An electronic device may include a wireless transceiver that enables the device to communicate with other electronic devices. In some cases, multiple transceivers can operate in the same environment, and potentially can transmit and receive data using one or more of the same communication channels. In order to reduce interference between multiple transceivers (e.g., two or more transceivers attempting to transmit data simultaneously using the same communication channel or overlapping communication channels), transceivers first can determine if a communication channel is being used by another device before proceeding with data transmission. As the criteria for determining if a communication channel is in use can vary based on various factors, a transceiver with configurable channel assessment functionality can be used to assess one or more different communication channels under a variety of different operating conditions.

One or more of the implementations described herein can provide various benefits. For example, determining if a communication channel is being used by other devices before proceeding with a data transmission can increase the efficiency by which multiple devices utilize a limited number of communication channels, and can increase the reliability of each communication. Further, as a transceiver can provide configurable channel assessment functionality, a transceiver can determine if a communication channel is in use under a variety of different operating conditions. For example, the transceiver can receive a user-selected first set of assessment parameters, and perform channel assessment according to that first set of assessment parameters. Subsequently, the transceiver can receive a user-selected second set of assessment parameters, and perform channel assessment according to that second set of assessment parameters. Thus, it is not necessary to design and manufacture different transceivers to suit each unique combination of operating conditions. Rather, a single configurable transceiver can be used in several different contexts, and can be re-configured to suit each different context. Likewise, in the event that the operating conditions change (e.g., if the device is operated in a different geographical region or using a different communications standard and/or physical layer), the transceiver need not be replaced, but instead can be re-configured as needed.

In general, in an aspect, a method of assessing one or more communication channels includes receiving, from a serial peripheral interface bus, an indication to initiate channel assessment. The method also includes receiving, from the serial peripheral interface bus, a user-selected first set of assessment parameters, the first set of assessment parameters indicative of a first time interval and a first energy threshold. The method also includes making a first comparison by comparing an average energy of a first communication channel during the first time interval to the first energy threshold, and determining whether or not the first communication channel is busy based on the first comparison. The method also includes replacing the first set of assessment parameters with a user-selected second set of assessment parameters, where the second set of assessment parameters are received from the serial peripheral interface bus, the second set of assessment parameters indicative of a second time interval and a second energy threshold different than the first time interval and the first energy threshold, respectively. The method also includes making a second comparison by comparing an average energy of a second communication channel during the second time interval to the second energy threshold, and determining whether or not the second communication channel is busy based on the second comparison. The method is performed by an integrated circuit chip.

Implementations of this aspect may include one or more of the following features:

In some implementations, receiving the first set of assessment parameters and making the first comparison can occur prior to replacing the first set of assessment parameters with the second set of assessment parameters and making the second comparison.

In some implementations, the first communication channel and the second communication channel can be different communication channels. In some implementations, the first communication channel and the second communication channel can be the same communication channel.

In some implementations, determining whether or not the first communication channel is busy can include, upon determining that the average energy of the first communication channel exceeds the first energy threshold, determining that the first communication channel is busy.

In some implementations, the method can further include, upon determining that the first communication channel is busy, preventing a device from transmitting data over the first communication channel at least until the first communication channel is clear.

In some implementations, determining whether or not the first communication channel is busy can include, upon determining that the average energy of the first communication channel does not exceed the first energy threshold, determining that the first communication channel is available for transmission. The method can also include, upon determining that the first communication channel is available for transmission, transmitting data over the first communication channel.

In some implementations, the first time interval and the second time interval can be selected from among a plurality of time interval values, and where the first energy threshold and the second energy threshold are selected from among a plurality of energy threshold values.

In some implementations, making a first comparison by comparing the average energy of the first communication channel during the first time interval to the first energy threshold can include receiving one or more first energy samples from the first communication channel during the first time interval, determining the average energy of the first communication channel based on the first energy samples, and comparing the average energy of the first communication channel to the first energy threshold.

In some implementations, the first set of assessment parameters and the second set of assessment parameters can be received from the serial peripheral interface bus through one or more registers.

In some implementations, the first time interval and the first energy threshold can correspond to a first communications standard, and where the second time interval and the second energy threshold correspond to a second communications standard different than the first communication standard.

In some implementations, the method can further include, upon determining that the first communication channel is busy, making an addition comparison by comparing an average energy of the first communication channel during an additional first time interval to the first energy threshold, determining whether or not the first communication channel is busy based on the additional comparison, and upon determining that the first communication channel is available for transmission, transmitting data over the first communication channel.

In general, in another aspect, a system includes an integrated circuit chip. The integrated circuit chip includes logic configured to receive, from a serial peripheral interface bus, an indication to initiate channel assessment. The logic is also configured to receive, from the serial peripheral interface bus, a user-selected first set of assessment parameters, the first set of assessment parameters indicative of a first time interval and a first energy threshold. The logic is also configured to make a first comparison by comparing an average energy of a first communication channel during the first time interval to the first energy threshold, and determine whether or not the first communication channel is busy based on the second comparison. The logic is also configured to replace the first set of assessment parameters with a user-selected second set of assessment parameters, where the second set of assessment parameters are received from the serial peripheral interface bus, the second set of assessment parameters indicative of a second time interval and a second energy threshold different than the first time interval and the first energy threshold, respectively. The logic is also configured to make a second comparison by comparing an average energy of a second communication channel during the second time interval to the second energy threshold, and determine whether or not the second communication channel is busy based on the second comparison.

Implementations of this aspect may include one or more of the following features:

In some implementations, the system can further include one or more registers configured to store the first set of assessment parameters and the second set of assessment parameters, and where the integrated circuit chip further includes logic to receive the first set of assessment parameters and the second set of assessment parameters from the serial peripheral interface bus through the one or more registers.

In some implementations, the registers can be configured to selectably store any one of a plurality of sets of assessment parameters as the first set of assessment parameters based on input from the serial peripheral interface bus, and store any other one of the plurality of sets of assessment parameters as the second set of assessment parameters based on input from the serial peripheral interface bus, where each set of assessment parameters corresponds to a different communications standard.

In some implementations, the integrated circuit chip can include logic configured to determine that the first communication channel is busy in response to determining that the average energy of the first communication channel exceeds the first energy threshold.

In some implementations, the integrated circuit can include logic configured to determine that the first communication channel is available for transmission in response to determining that the average energy of the first communication channel does not exceed the first energy threshold.

In some implementations, the integrated circuit can include logic configured to receive one or more first energy samples from the first communication channel during the first time interval, determine the average energy of the first communication channel based on the first energy samples, and compare the average energy of the first communication channel to the first energy threshold.

In general, in another aspect, a transceiver includes a register bank configured to store data indicative of an instruction to initiate channel assessment based on input from the serial bus interface, store a first set of assessment parameters based on input from a serial bus interface, the first set of assessment parameters indicative of a first time interval and a first energy threshold, and replace the first set of assessment parameters with a user-selected second set of assessment parameters based on input from the serial bus interface, the second set of assessment parameters indicative of a second time interval and a second energy threshold. The system also includes a radio module, and a baseband module operatively coupled to the register bank and the radio module. The baseband module is configured to retrieve the data indicative of the instruction to initiate channel assessment, and responsive to retrieving the data indicative of the instruction to initiate channel assessment, retrieve the first set of assessment parameters or the second set of assessment parameters from the register bank, request, from the radio module, one or more energy measurements of a communication channel based on the first time interval or the second time interval, determine an average energy of the communication channel based on energy measurements received from the radio module, compare the average energy of the communication channel to the energy threshold, and determine whether or not the communication channel is busy based on the comparison.

The details of one or more implementations are set forth in the accompanying drawings and the description below. Other features and advantages will be apparent from the description and drawings, and from the claims.

BRIEF DESCRIPTION OF DRAWINGS

FIG. 3A is a diagram of an example channel assessment process.
FIG. 3B is a diagram of another example channel assessment process.

DETAILED DESCRIPTION

An electronic device may include a wireless transceiver that enables the device to communicate with other electronic devices. For example, devices such as computers, tablet computers, cellular phones, access points, routers, and peripherals often include one or more wireless transceivers to transmit and receive data from other devices. In some cases, multiple transceivers can operate in the same environment, and potentially can transmit and receive data using one or more of the same communication channels. In order to reduce interference between multiple transceivers (e.g., two or more transceivers attempting to transmit data simultaneously using the same communication channel or overlapping communication channels), transceivers first can determine if a communication channel is being used by another device before proceeding with data transmission. In many cases, this can increase the efficiency by which multiple transceivers utilize a limited number of communication channels, and can increase the reliability of each communication. As the criteria for determining if a communication channel is in use can vary based on various factors, a transceiver with configurable channel assessment functionality can be used to assess one or more different communication channels under a variety of different operating conditions.

Figure 1:
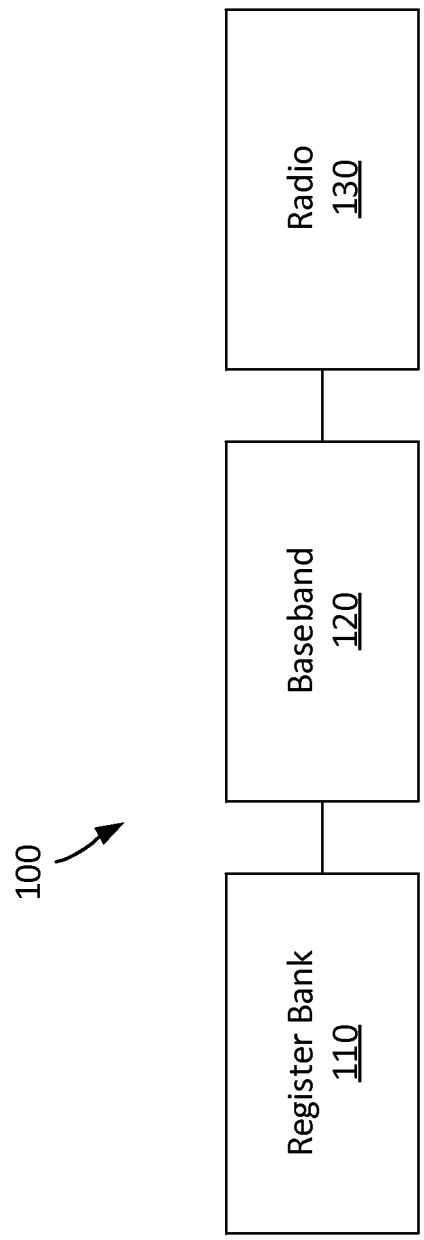
FIG. 1 is a diagram of an example transceiver.

A simplified example of a transceiver 100 is shown in FIG. 1. The transceiver 100 includes a register bank 110, a baseband 120 and a radio 130. The register bank 110, baseband 120, and radio 130 are operatively coupled such that each of the components can communicate with each other (e.g., to exchange data and instructions between them).

The register bank 110 stores data that can be retrieved by the other components of the transceiver 100. The register bank 110 includes one or more registers, each of which can be used to store a particular portion of data. Data stored in the register bank 110 can be retrieved by the other components of the transceiver 100. For example, the register bank 110 can store parameters that define various aspects of the operation of the transceiver 100, and these parameters can be retrieved by the baseband 120 or the radio 130 during operation of the transceiver 100. Data also can be stored on the register bank 110 by the components of the transceiver 100. For example, the baseband 120 or the radio 130 can use the register bank 110 to store various pieces of data, such as data describing the status of each of the components, the outcome of one or more operations performed by the components, and so forth.

The baseband 120 manages the functionality of the transceiver 100. For instance, the baseband 120 can retrieve information from the register bank 110, and manage the operation of the radio 130 based on the retrieved information. As an example, based on information retrieved from the register bank 110, the baseband 120 can manage the modulation of information prior to transmission by the radio 130, the demodulation of radio signals received by the radio 130, or other aspects of the encoding and decoding data. As another example, the baseband 120 can manage the operation of the radio 130, for instance to instruct the radio 130 to switch between an active or inactive state, or to transmit data and receive data in a particular manner (e.g., at a particular frequency or range of frequencies, at a particular transmission power, and so forth).

The radio 130 transmits information by generating radiation of electromagnetic signals, and receives information by measuring radiation of electromagnetic signals. For example, the radio 130 can generate a radio frequency alternating current based on information received from the baseband 120, and apply the alternating current to a suitable conductor (e.g., an antenna). When excited by this alternating current, the antenna radiates radio waves, thereby broadcasting the information into the surrounding environment. As another example, the radio 130 can measure radiating radio waves that are incident upon the conductor, and transmit the measurements to the baseband 120 for analysis.

The transceiver 100 can transmit information according to one or more communications standards. A communications standard establishes uniform engineering and/or technical criteria, processes, and practices for communicating in a particular manner. Example standards include IEEE 802.15.4g, ETSI TS 102 887, IEEE 802.15.4-2003, IEEE 802.15.4-2006, and IEEE 802.15.4-2011, among others.

In some cases, a communications standard can specify one or more physical layers each of which defines, at a bit-level, the particular mechanism by which data is transmitted between different devices. A physical layer can include, for instance, specification of particular electronic or mechanical interfaces connecting to the physical medium for synchronized communication. A physical layer also can include, for instance, specification of particular modulation techniques, signal multiplexing techniques, and error correction techniques to facilitate the transmission of data across the physical medium. Example physical layers include frequency-shift keying (FSK), orthogonal frequency-division multiplexing (OFPM), and offset quadrature phase-shift keying (OQPSK), among others.

A communications standard also can define particular communication channels that are available for data transmission. A communication channel can be, for example a specific radio frequency or range of radio frequencies at which information can be transmitted and received. For instance, a communications standard can specify a broad range of frequencies that are available for data transmission, and specify individual frequency bands within that range that are allocated to particular channels.

A communications standard also can specify particular location-specific protocols, operating parameters, or restrictions. For example, a communications standard can specify a limit to maximum transmission power in accordance with regional regulations. These regions can be defined, for example, based on geographical location (e.g., country, county, or municipality of operation).

In many cases, multiple transceivers 100 can be operating in the same environment, and potentially can be transmitting and receiving data using one or more of the same communication channels. In order to reduce interference between multiple transceivers 100 (e.g., two or more transceivers 100 attempting to transmit data simultaneously using the same communication channel or overlapping communication channels), each transceiver 100 first can determine if a communication channel is being used another transceiver 100 before proceeding with data transmission. If the transceiver 100 determines that the communication channel is in use (e.g., "busy"), the transceiver 100 delays data transmission until the communication channel is determined to be available for use (e.g., "clear"). This assessment can be performed, for example, by the baseband 120 and the radio 130.

A transceiver 100 can determine if a communication channel is in use based on one or more assessment criteria.

For example, a transceiver 100 can determine the amount of energy currently being transmitted through a communication channel (e.g., by measuring the amount of energy being transmitted over the channel, averaged over a particular interval of time). If the energy transmitted through the communication channel exceeds a particular threshold amount (e.g., if the average energy over the interval of time exceeds a threshold average amount), the transceiver 100 determines that the communication channel is busy. If not, the transceiver 100 determines that the communication channel is clear. As another example, a transceiver 100 can determine if recognizable data can be retrieved from the communication channel (e.g., a valid frame of data or a modulated signal). If so, the transceiver 100 determines that the communication channel is busy. If not, the transceiver 100 determines that the communication channel is clear.

These criteria can differ depending on the communications standard, physical layer, network configurations, and/or locality. For example, a particular threshold amount of energy and interval of time might be used for one communications standard, and a different threshold amount of energy and/or interval of time might be used for another communications standard. As another example, a single communications standard might define different criteria for each of several physical layers and/or localities. For instance, a particular threshold amount of energy and interval of time might be used for one physical layer, and another threshold amount of energy and/or interval of time might be used for another physical layer. In some cases, some communication standards define the interval of time and the threshold amount of energy relative to a certain physical layer characteristic. This can leads to different absolute settings. For example, in some cases, the interval of time may depend on the number of physical layer symbols and the absolute symbol length depend on the physical layer and/or data rate.

In some implementations, a transceiver is capable of transmitting and receiving data according to multiple different communications standards, using multiple different physical layers, and/or within different geographical regions. As such, the transceiver should consider the appropriate assessment criteria in determining if a particular communication channel is in use.

Figure 2:
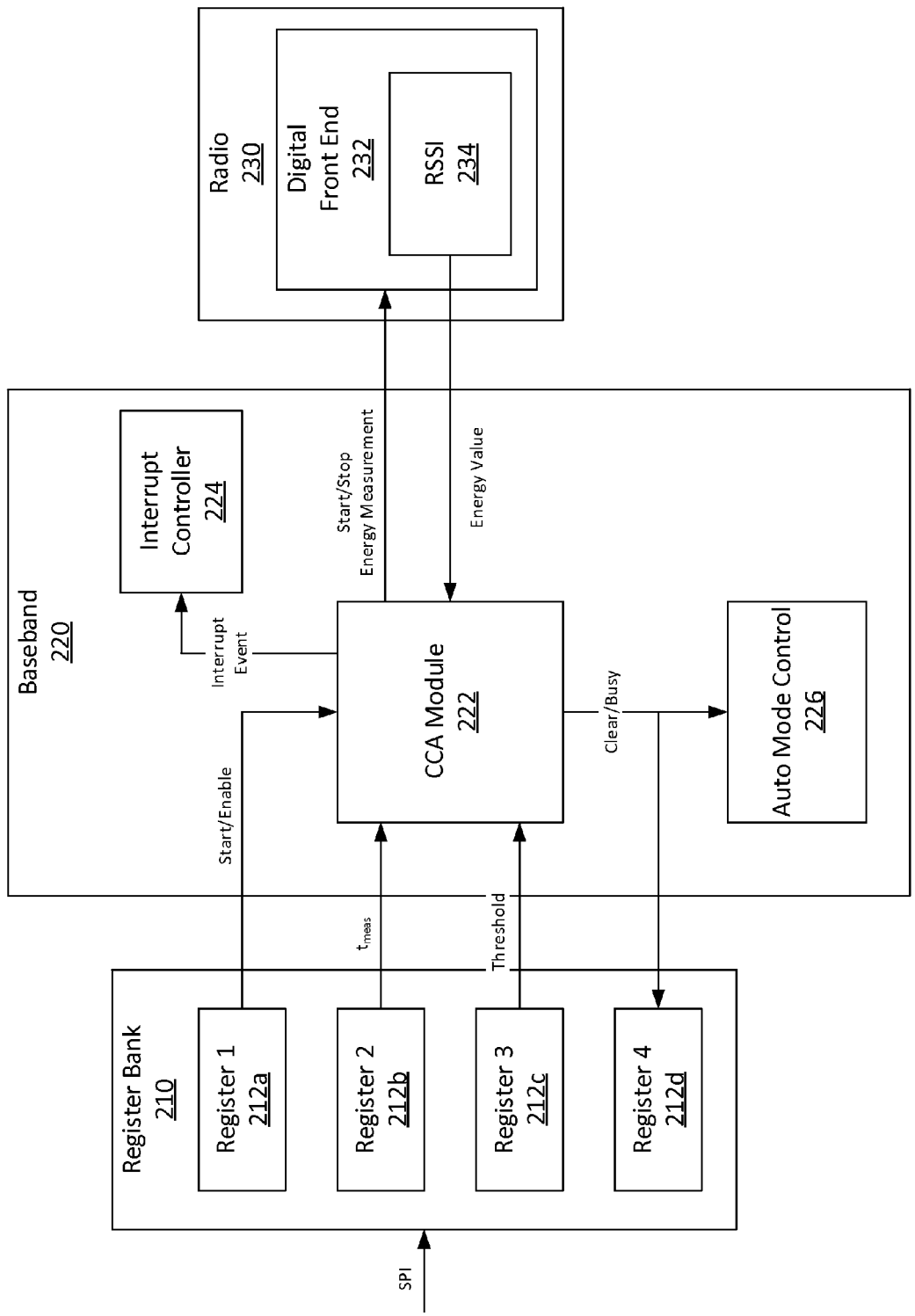
FIG. 2 is a diagram of another example transceiver.

An example transceiver 200 for assessing a communication channel is shown in FIG. 2. The transceiver 200 includes a register bank 210, a baseband 220, and a radio 230. As with the transceiver 100 shown in FIG. 1, the register bank 210, and baseband 220 and the radio 230 of transceiver 200 are operatively coupled such that each of the components can communicate with each other (e.g., to exchange data and instructions between them).

The register bank 210 can be similar to the register bank 110 shown in FIG. 1. For example, the register bank 210 stores data that can be retrieved by the other components of the transceiver 200. As shown in FIG. 2, the register bank 210 stores data in registers 212*a-d*, each of which stores a particular amount of data. Data stored in the registers 212*a-d* can be retrieved by the other components of the transceiver 200. For example, the registers 212*a-d* can include parameters that define various aspects of the operation of the transceiver 200, and can be retrieved by the baseband 220 or the radio 230 during operation of the transceiver 100. As shown in FIG. 2, the register 212*a* stores data indicating when a communication channel should be assessed. As an example, the data contained within the register 212*a* can be modified in order to trigger a channel assessment procedure. The register 212*b* stores data indicating a particular time interval, and the register 212*c* stores data indicating a particular threshold amount of energy. As an example, the data contained with the registers 212*b-c* can be modified in order to specify different channel assessment parameters for use with a channel assessment procedure. The register 212*d* stores data indicating if the communication channel is busy or clear. As an example, the data contained within the register 212*d* can be modified based on the results of a channel assessment procedure, and can be retrieved by one or more other devices. Data can be transmitted to and from each of the registers 212*a-d* through an appropriate communications interface, for example a serial peripheral interface (SPI) bus. In some cases, some or all of the data stored within the registers 212*a-d* is user-selectable. For example, the data stored within the registers 212*a-d* can be selected and stored, at least in part, based on user input.

The baseband 220 can be similar to the baseband 120 shown in FIG. 1. For instance, the baseband 220 retrieves information from the register bank 210, and manages the operation of the radio 230 based on the retrieved information. This can include, for example, managing the modulation of information prior to transmission by the radio 230, the demodulation of radio signals received by the radio 230, or other aspects of the encoding and decoding data. This also can include managing the operation of the radio 230, for instance to instruct the radio 230 to switch between an active or inactive state, or to transmit data and receive data in a particular manner (e.g., at a particular frequency or range of frequencies, at a particular transmission power, and so forth). As described above, this also can include determining if a communication channel is being used by another transceiver, and adjusting the operation of the radio 230 accordingly.

The radio 230 can be similar to the radio 130 shown in FIG. 1. For example, the radio 230 transmits information by generating radiation of electromagnetic signals, and receives information by measuring radiation of electromagnetic signals. This can include, for example, generating a radio frequency alternating current based on information received from the baseband 220, and applying the alternating current to an antenna. This also can include, for example, measuring radiating radio waves that are incident upon the antenna, and transmitting the measurements to the baseband 220 for analysis.

As described above, in order to reduce interference between multiple transceivers, a transceiver first can determine if a communication channel is being used by another transceiver before proceeding with data transmission. If the transceiver determines that the communication channel is busy, the transceiver delays data transmission until the communication channel is determined to be clear. This assessment can be performed, for example, by the configurable clear channel assessment (CCA) module 222 of the baseband 220.

In general, the CCA module 222 receives signal measurements from a particular communication channel and a set of criteria for assessing that channel. Based on this information, the CCA module 222 determines the state of the communication channel (e.g., if the channel is busy or clear), and reports the state of the communication channel to one or more other components of the transceiver 200. By using different sets of assessment criteria, the CCA module 222 can determine the status of a communication channel according to any one of several combinations of communications standards, physical layers, geographical locations, or other factors. Thus, the CCA module 222 provides configurable channel assessment functionality for the transceiver 200.

The CCA module 222 is operatively coupled to the register bank 210 (e.g., to each of the registers 212a-d), such that the CCA module 222 can retrieve data stored within the register bank 210. The CCA module 222 also is coupled operatively to the radio 230, such that it can manage the operation of the radio 230 and retrieve signal measurements obtained by the radio 230. The CCA module 222 also is coupled operatively to an interrupt controller 224, such that it can transmit interrupt signals to control or otherwise modify the operation of the transceiver 200.

In an example implementation, the CCA module 222 retrieves the data stored in one or more of the registers 212a-c. For instance, the CCA module 222 retrieves the data stored in register 212a and, based on this data, determines whether or not to begin assessing a communication channel. In some implementations, the register 212a can store a particular value indicating that the channel should be assessed (e.g., a value of "1"), or another value indicating that the channel should be not assessed (e.g., a value of "0"). The CCA module 222 can poll the contents of the register 212a (e.g., continuously, intermittently, or arbitrarily retrieving the contents of the register 212a) in order to determine when to begin assessing the communication channel. The contents of the register 212a can be modified through the SPI bus, for example in response to a command from another component of the transceiver 200 or another device altogether.

In some implementations the CCA module 222 can begin assessing a communication channel automatically before the transceiver 200 attempts to send data across a communication channel. For example, the baseband 220 can include an automatic mode control module (226) that determines if the transceiver 200 is attempting to transmit data. Before the data is transmitted, the automatic mode control module 226 initiates a channel assessment (e.g., by modifying the contents of the register bank 210, or by transmitting a command directly to the CCA module 222).

When the CCA module 222 receives an indication to begin assessing the communication channel, it retrieves the data store in the registers 212b-c. The registers 212b-c each contain an assessment criterion to be used during the assessment of the communication channel. For example, the register 212b stores data that indicates a particular time interval for which the communication channel should be measured ($t_{meas}$), and the register 212c stores data that indicates a particular threshold amount of energy (Threshold) that should be used in assessing the state of the communication channel. As with the contents of the register 212a, the contents of the registers 212b-c also can be modified through an SPI bus, for example in response to a command from another component of the transceiver 200 or another device altogether.

After retrieving the assessment criteria from the registers 212b-c, the CCA module 222 instructs the radio 230 to obtain energy measurements for the time interval ($t_{meas}$). For example, the CCA module 222 can transmit a command to the radio 230 to begin energy measurements, then transmit an command to the radio 230 to end energy measurements after the time interval ($t_{meas}$) has elapsed. In some cases, this command can be transmitted to a digital front end (DFE) 232 of the radio 230. The DFE 232 can include, for example, one or more filters, low-noise amplifiers (LNAs), down-conversion mixers, and other components needed to process the modulated signals received at an antenna into signals suitable for input into baseband 220.

Upon receiving instructions from the CCA module 222 to begin energy measurements, the radio 230 obtains one or more measurements samples from the communication channel. As an example, the radio 230 can determine the amount of energy incident upon antenna at the frequency (or band of frequencies) corresponding to the communication channel. In some cases, the amount of energy is measured can be measured by the DFE using an automatic gain control (AGC) module.

Based on the amount of energy that is detected for a given time period (e.g., a pre-determined sample period), the radio 230 calculates a metric that represents the detected amount of energy. For example, the radio 230 can detect the amount of energy during a particular sample period, and calculate a received signal strength indication (RSSI) metric that indicates the amount of energy that was detected at that frequency range and for that sample period. This metric then is forwarded to the CCA module 222. Sampling and metric calculation can be performed, for example, by an RSSI module 234 of the radio 230. The radio 230 can repeat obtaining energy measurement samples and transmitting these measurement samples to the CCA module 222 until it receives a command to end energy measurement (e.g., until the time interval ($t_{meas}$) elapses).

Based on the received energy samples received from the radio 230, the CCA module 222 calculates the average energy of the communication channel. This can be performed, for example, by averaging the metrics for each of the samples received from the radio 230. After calculating the average energy, the CCA module 222 compares the average energy against the threshold amount of energy (Threshold). If the average energy exceeds the threshold energy (Threshold), the CCA module determines that the communication channel is in use by another device (e.g., "busy"). If the average energy does not exceed the threshold energy (Threshold), the CCA module 222 determines that the communication channel is not in use by another device (e.g., "clear") and is available for use by the transceiver 200. The CCA module 222 transmits data indicating the state of the communication channel to the register 212d, where it can be retrieved by the other components of the transceiver 200 or by another device altogether. In some implementations, the CCA module 222 also transmits data indicating the state of the communication channel to the automatic mode control module 226. In response, the automatic module control module 226 either can initiate data transmission across the communication channel (e.g., when the communication channel is "clear"), or prevent data from being transmitted across the communication by the transceiver 200 at least until the communication channel is clear (e.g., when the communication channel is "busy").

In some implementations, instead of calculating an average energy of the communication channel across multiple samples, the CCA module 222 can use a single energy measurement from a single measurement sample. For example, the CCA module 222 can instruct the radio 230 to obtain a single measurement sample, and compare the metric from the single measurement sample against the threshold energy (Threshold). This can be beneficial in some circumstances, for example if it is desirable to assess a communication channel quickly.

The CCA module 222 also can control or otherwise modify the operation of the transceiver 200 based on the status of the communication channel. For example, the CCA module 222 can send one or more interrupt signals to the interrupt controller 224. Based on the received interrupt signals, the interrupt controller 224 can modify the operation of the transceiver 200. For example, upon determining that the communication channel is in use by other device, the CCA module 222 can transmit an interrupt signals to the interrupt controller 224, indicating that the transmission of data to the communication channel should be prevented, interrupted, or otherwise delayed until the communication channel is ready for use. As another example, upon determining that the communication is not in use by another device, the CCA module 222 can transmit an interrupt signals to the interrupt controller 224, indicating that the transmission of data can proceed.

The CCA module 222 can assess a communication channel continuously, periodically, or arbitrarily (e.g., in response to a command by a user, another component of the transceiver 200, or another device altogether). In some cases, the CCA module 222 can assess a communication channel, and based on the result of the assessment, either continue or discontinue assessment. As an example, referring to FIG. 3A, a CCA module 222 assesses the status of a communication channel (time interval 302). Upon determining that the communication channel is clear (event 304), the CCA module 222 reports that the communication channel is clear, and the transceiver 200 proceeds transmitting data (time interval 306).

If the communication channel is not clear, the CCA module 222 can continue assessing the channel periodically. As an example, referring to FIG. 3B, a CCA module 222 assesses the status of a communication channel (time interval 320). Upon determining that the communication channel is busy (event 322), the CCA module 222 reports that the communication channel is clear and "backs off" for a particular amount of time (time interval 324). This "back off" time period can vary, depending on the implementation. For example, in some cases the back off time period can be pre-determined (e.g., a value that is specified by a user, by the transceiver 200, or by another device altogether). In some cases, the back off time period can be defined according to a communications standard. After the back off time period has elapsed, the CCA module 222 again assesses the status of the communication channel (time interval 326). Upon determining that the communication channel is clear (event 328), the CCA module 222 reports that the communication channel is clear, and the transceiver 200 proceeds transmitting data (time interval 330). In this manner, the CCA module 222 can assess a communication channel, and if the communication channel is busy, prevent the transceiver 200 from transmitting data and repeat the assessment periodically until the communication channel is no longer busy.

Although the example shown in FIG. 3B illustrates a single repetition of channel assessment, in practice, the CCA module 222 can repeat channel assessment any number of times. In some implementations, the repetition of channel assessment can be limited to a particular number (e.g., in order to prevent the transceiver 200 from endlessly assessing a channel). In some implementations, the repetition of channel assessment is not limited to a particular number, and can repeat until the communication channel is clear or until the process is manually interrupted.

As described above, in some implementations, a transceiver can transmit and receive data according to multiple different communications standards, using multiple different physical layers, and/or within different geographical regions. As such, the transceiver should be configured to consider the appropriate assessment criteria in determining if a particular communication channel is in use. This can be achieved using the register bank 210. For example, the register 212b stores data indicating a particular time interval ($t_{meas}$) in which the energy of a communication channel should be measured, and the register 212c stores data indicating a particular threshold amount of energy (Threshold) that is used to determine if the communication channel is busy or clear.

As one or more of these values can differ, depending on the particular communications standard and physical layer being used, and depending on the geographical region in which the transceiver is operating, the contents of the registers 212b and 212c can be modified depending on the particular operating conditions of the transceiver. For example, if a particular communications standard and physical layer are being used in a particular location, data reflecting the appropriate time interval ($t_{meas}$) and threshold amount of energy (Threshold) are stored in the registers 212b and 212c, respectively. If another communications standard or physical layer are used, the contents of the registers 212b and 212c can be modified as necessary (e.g., through the SPI bus). Similarly, if the transceiver begins operating in a new geographical region, the contents of the registers 212b and 212c also can be modified as necessary. In this manner, the CCA module 222 is not limited to any one set of assessment parameters, and can perform channel assessment according to assessment parameters specific to any combination of communications standards, physical layers, and/or geographical locations.

In some cases, the contents of the register bank 210 can be modified by another component of the transceiver 200 (e.g., by a data processing apparatus) to suit the circumstances under which the transceiver 200 operates. For example, a data processing apparatus can obtain information regarding the current communications standard, physical layer, and/or geographical location of the transceiver 200. Based on this information, the data processing apparatus can determine an appropriate set of assessment parameters, and modify the contents of the register bank 210 as needed. In some cases, the data processing apparatus can modify the contents of the register bank 210 automatically or semi-automatically, such that no user input is required. Accordingly, once the CCA module 222 retrieves the contents of the register bank 210, the CCA module 222 will perform channel assessment according to appropriate parameters.

In some cases, the contents of the register bank 210 can be modified based, at least in part, on user input. For example, in some cases, the contents of the register bank 210 can reflect a user selection (e.g., a user selection of a particular communication standard, physical layer, and/or graphical location, or a user selection of specific assessment parameters). The contents of the register bank 210 can be subsequently modified based, at least in part, on additional user input. For example, in some cases, the contents of the register bank 210 can be subsequently modified to reflect a different user selection (e.g., a user selection of a different communication standard, physical layer, and/or graphical location, or a user selection of different specific assessment parameters). This can be performed, for example, by replacing, overwriting, or otherwise modifying the contents of the register bank 210.

In some cases, the contents of the register bank 210 can be modified "on the fly," such that the assessment parameters can be stored and/or modified before, during, and/or after the performance of each channel assessment. For example, in some cases, the register bank 210 can store a first set of assessment parameters (e.g., a first set of user selected parameters), and the transceiver 200 can perform one or more channel assessments according to the first set of assessment parameters. Subsequently, the register bank 210 can store a second set of assessment parameters (e.g., a second set of user selected parameters), and the transceiver 200 can perform one or more channel assessments according to the second set of assessment parameters. In this manner, the transceiver 200 need not operate according to a pre-defined set of assessment parameters (e.g., assessment parameters that were pre-defined during the initial manufacturing process), and can instead by re-configured by a user as needed prior to each use. As an example, a user can select certain assessment parameters based on the expected operating context of the transceiver 200 (e.g., based on an expected communication standard, physical layer, and/or location). If the operating context later changes (e.g., if the communication standard, physical layer, and/or location later changes), the user can select new assessment parameters based on the new operating context.

In practice, the specific values of each of the assessment parameters can vary, depending on the implementation. For example, in some cases, the time interval ($t_{meas}$) can be selected from among a pool of time interval values, where each time interval value in the pool corresponds to one or more particular combinations of factors (e.g., combinations of communications standard, physical layer, and/or geographical location). As an example, in some cases, the time interval values in the pool can include 2 µs, 8 µs, 32 µs, 128 µs, 512 µs, and/or any other interval of time. In some cases, the time interval values in the pool can be selected based on the sampling rate of the radio 230 (e.g., the sampling rate of the DFE 232).

Similarly, in some cases, the threshold amount of energy (Threshold) can be selected from among a pool of energy values, where each time energy value in the pool corresponds to one or more particular combinations of factors (e.g., one or more combinations of communications standard, physical layer, and/or geographical location). In some cases, the energy values in the pool can be expressed as an RSSI value with arbitrary units. For example, in some implementations, the energy values in the pool can be scaled according to an arbitrary range (e.g., between 0 and 127), and each energy value can be a value within that range (e.g., 1, 10, 20, 30, 40, 50 and/or any other value). In some cases, the energy values in the pool can be expressed as a ratio between a power measurement and a reference amount of power. For example, in some implementations, the energy values in the pool can be expressed in Decibel-milliwatts (dBm), and can include −6 dBm, −3 dBm, −1 dBm, 0, dBm, 1 dBm, 3 dBm, 6 dBm, or any other value.

Although example transceivers are shown in FIG. 1 and FIG. 2, these are simplified examples to illustrate the concept of configurable channel assessment. In practice, a transceiver can include other components, either in addition to or instead of those described above. For example, although FIG. 2 shows components of the transceiver 200 in connection with configurable channel assessment functionality, the transceiver 200 can include additional components related to the above described functionality or other aspects of the transceiver 200.

Figure 4:
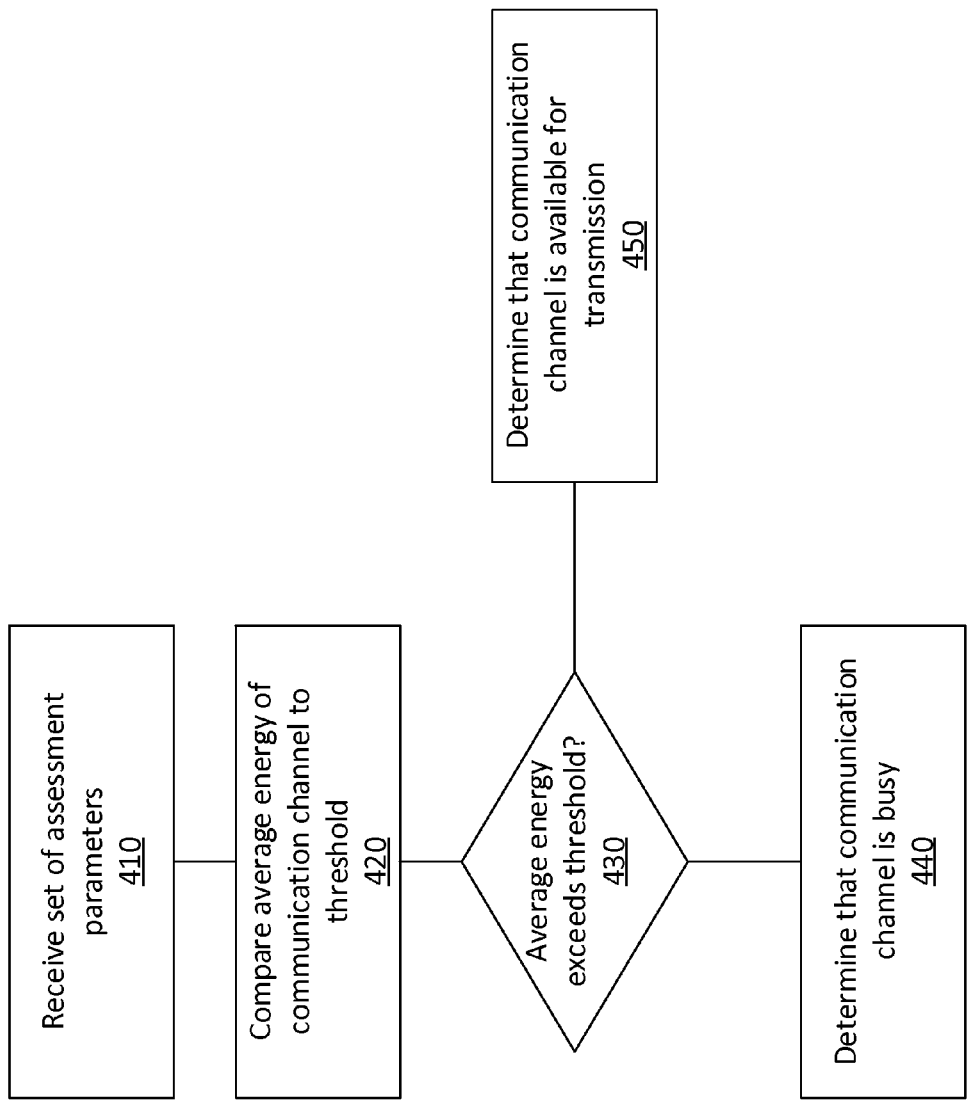
FIG. 4 is a flow chart of an example process for assessing a communication channel.

An example process 400 for assessing a communication channel is shown in FIG. 4. The process 400 can be performed, for example, either partially or entirely by a transceiver 200. The process 400 can be initiated in various ways. For example, in some case, the process 400 is initiated when data is written to a register (e.g., the register 212a shown in FIG. 2) indicating that a channel assessment procedure should begin.

The process 400 begins by receiving a set of assessment parameters (step 410). The set of assessment parameters can include data that is indicative of a time interval and an energy threshold. For example, these assessment parameters can include the time interval ($t_{meas}$) and the threshold amount of energy (Threshold) described above. As also described above, the set of assessment parameters can be stored in a register bank (e.g., the register bank 210), and retrieved by a baseband (e.g., the base band 220). In some implementations, the set of parameters can correspond to a particular communications standard. In some cases, one or more of the assessment parameters can be selected from among a plurality of values. For example, a time interval can be selected from among a plurality of different time intervals, each corresponding to a particular combination of communications standard, physical layer, and/or locality. As another example, a threshold amount of energy can be selected from among a plurality of different threshold amounts of energy, each also corresponding to a particular combination of communications standard, physical layer, and/or locality. In this manner, an appropriate set of assessment parameters is selected based on the specific operating conditions of a device. In some cases, the set of assessment parameters can be user-selected. For example, the set of assessment parameter can be based, at least in part, on user specified information (e.g., a user selection of a particular communication standard, physical layer, and/or graphical location, or a user selection of specific assessment parameters).

After receiving the set of assessment parameters, the process 400 continues by comparing the average energy of a communication channel to the threshold (step 420). As described above, this comparison can include receiving one or more energy samples from the communication channel during the time interval, and determining the average energy of the communication channel based on the energy samples. This average energy can then be compared to the energy threshold.

The process 400 continues to determine if the average energy exceeds the threshold (step 430). If so, it is determined that the communication channel is busy (step 440). In some implementations, upon determining that the communication channel is busy, the transmission of data over the communication channel can be prevented, interrupted, or delayed until the communication channel is clear.

If the average energy does not exceed the threshold, it is determined that the communication channel is available for transmission (step 450). In some implementations, upon determining that the communication channel is available for transmission, data is transmitted over the communication channel.

In some implementations, process 400 can be repeated, either in in part or as a whole, in order to assess a second communication channel. For instance, one or more of the steps 410, 420, 430, 440, and 450 can be repeated for a second communication channel. As an example, a second set of assessment parameters can be received, where the second set of assessment parameters includes a second time interval and a second energy threshold value different than the first time interval and the first energy threshold value. In some cases, the second set of assessment parameters also can be user-selected. For example, the second set of assessment parameter can be based, at least in part, on user specified information (e.g., a user selection of a particular communication standard, physical layer, and/or graphical location, or a user selection of specific assessment parameters).

The average energy of the second communication channel is compared to the second energy threshold value. If the average energy of the second communication channel exceeds the second threshold, it is determined that the communication channel is busy. In a similar manner as described above, upon determining that the second communication channel is busy, the transmission of data over the second communication channel can be prevented, interrupted, or delayed until the second communication channel is clear. If the average energy of the second communication channel does not exceed the second threshold, it is determined that the communication channel is available for transmission. In a similar manner as described above, upon determining that the second communication channel is available for transmission, data can be transmitted over the second communication channel.

Although two communication channels are described above, these two communication channels need not be different. For example, in some cases, the first communication channel and the second communication channel are the same communication channel, and that communication channel can be assessed according to different sets of assessment parameters. Conversely, in some cases, the first communication channel and the second communication channel are different communication channels, and the communication channels can each be assessed according to different sets of assessment parameters. Further, although the examples above describe how two different assessment parameters can be used to assess two different communication channels, in practice, any number of communication channels can be assessed based on criteria corresponding to any number of different communications standards, physical layers, and/or locations. Thus, the process 400 can be performed in order to assess communication channels in a broad range of operating conditions.

In the examples above, registers (e.g., 212a-d in register bank 210) are used to store data such as assessment parameters, indications to initiate channel assessment, and so forth. In practice, however, data can be stored using one or more other data storage devices, such as memory modules. As an example, data (e.g., assessment parameters and/or indications to initiate channel assessment) can be stored at particular locations of one or more memory modules, and the baseband 120 (e.g., the CCA module 222) can retrieve this data from the appropriate locations of the memory modules. Likewise, although the above examples describe the use of one or more SPI buses to modify the contents of a register, other mechanisms can be used to modify the contents of a register and/or memory module, as appropriate for the implementation.

One or more of the above described implementations can provide various benefits. For example, determining if a communication channel is being used by other devices before proceeding with a data transmission can increase the efficiency by which multiple devices utilize a limited number of communication channels, and can increase the reliability of each communication. Further, as a transceiver can provide configurable channel assessment functionality, a transceiver can determine if a communication channel is in use under a variety of different operating conditions. Thus, it is not necessary to design and manufacture different transceivers to suit each unique combination of operating conditions. Rather, a single configurable transceiver can be used in several different contexts. Likewise, in the event that the operating conditions change (e.g., if the device is operated in a different geographical region or using a different communications standard and/or physical layer), the transceiver need not be replaced, but instead can be re-configured as needed.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the registers 110 and 210, the basebands 120 and 220, and the radios 130 and 230 can be implemented using digital electronic circuitry, or in computer software, firmware, or hardware, or in combinations of one or more of them. In another example, the process 400 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the disclosure. Accordingly, other implementations are within the scope of the following claims.

What is claimed is:

1. A method of assessing one or more communication channels, the method comprising:
    receiving, from a serial peripheral interface bus, an indication to initiate channel assessment;
    receiving, from the serial peripheral interface bus, a user-selected first set of assessment parameters, the first set of assessment parameters indicative of a first time interval and a first energy threshold;
    making a first comparison by comparing an average energy of a first communication channel during the first time interval to the first energy threshold, wherein making the first comparison comprises:
        receiving one or more first energy samples from the first communication channel during the first time interval;
        determining the average energy of the first communication channel based on the one or more first energy samples; and
        comparing the average energy of the first communication channel to the first energy threshold;
    determining whether or not the first communication channel is busy based on the first comparison;
    replacing the first set of assessment parameters with a user-selected second set of assessment parameters, wherein the second set of assessment parameters are received from the serial peripheral interface bus, the second set of assessment parameters indicative of a second time interval and a second energy threshold different than the first time interval and the first energy threshold, respectively;
    making a second comparison by comparing an average energy of a second communication channel during the second time interval to the second energy threshold; and
    determining whether or not the second communication channel is busy based on the second comparison; and
    wherein the method is performed by an integrated circuit chip.

2. The method of claim 1, wherein receiving the first set of assessment parameters and making the first comparison occur prior to replacing the first set of assessment parameters with the second set of assessment parameters and making the second comparison.

3. The method of claim 1, wherein the first communication channel and the second communication channel are different communication channels.

4. The method of claim 1, wherein the first communication channel and the second communication channel are the same communication channel.

5. The method of claim 1, wherein determining whether or not the first communication channel is busy comprises:

upon determining that the average energy of the first communication channel exceeds the first energy threshold, determining that the first communication channel is busy.

6. The method of claim 1, further comprising:
upon determining that the first communication channel is busy, preventing a device from transmitting data over the first communication channel at least until the first communication channel is clear.

7. The method of claim 1, wherein determining whether or not the first communication channel is busy comprises:
upon determining that the average energy of the first communication channel does not exceed the first energy threshold, determining that the first communication channel is available for transmission.

8. The method of claim 7, further comprising:
upon determining that the first communication channel is available for transmission, transmitting data over the first communication channel.

9. The method of claim 1, wherein the first set of assessment parameters and the second set of assessment parameters are received from the serial peripheral interface bus through one or more registers.

10. The method of claim 1, wherein the first time interval and the first energy threshold correspond to a first communications standard, and wherein the second time interval and the second energy threshold correspond to a second communications standard different than the first communication standard.

11. A system comprising:
an integrated circuit chip comprising logic configured to:
receive, from a serial peripheral interface bus, an indication to initiate channel assessment;
receive, from the serial peripheral interface bus, a user-selected first set of assessment parameters, the first set of assessment parameters indicative of a first time interval and a first energy threshold;
make a first comparison by comparing an average energy of a first communication channel during the first time interval to the first energy threshold, wherein making the first comparison comprises:
receiving one or more first energy samples from the first communication channel during the first time interval;
determining the average energy of the first communication channel based on the one or more first energy samples; and
comparing the average energy of the first communication channel to the first energy threshold;
determine whether or not the first communication channel is busy based on the first comparison;
replace the first set of assessment parameters with a user-selected second set of assessment parameters, wherein the second set of assessment parameters are received from the serial peripheral interface bus, the second set of assessment parameters indicative of a second time interval and a second energy threshold different than the first time interval and the first energy threshold, respectively;
make a second comparison by comparing an average energy of a second communication channel during the second time interval to the second energy threshold; and
determine whether or not the second communication channel is busy based on the second comparison.

12. A method of assessing one or more communication channels, the method comprising:
receiving, from a serial peripheral interface bus, an indication to initiate channel assessment;
receiving, from the serial peripheral interface bus, a user-selected first set of assessment parameters, the first set of assessment parameters indicative of a first time interval and a first energy threshold;
making a first comparison by comparing an average energy of a first communication channel during the first time interval to the first energy threshold;
determining whether or not the first communication channel is busy based on the first comparison;
replacing the first set of assessment parameters with a user-selected second set of assessment parameters, wherein the second set of assessment parameters are received from the serial peripheral interface bus, the second set of assessment parameters indicative of a second time interval and a second energy threshold different than the first time interval and the first energy threshold, respectively;
making a second comparison by comparing an average energy of a second communication channel during the second time interval to the second energy threshold; and
determining whether or not the second communication channel is busy based on the second comparison;
wherein the first time interval and the first energy threshold correspond to a first communications standard, and wherein the second time interval and the second energy threshold correspond to a second communications standard different than the first communication standard; and
wherein the method is performed by an integrated circuit chip.

13. The method of claim 12, wherein the first time interval and the second time interval are selected from among a plurality of time interval values, and wherein the first energy threshold and the second energy threshold are selected from among a plurality of energy threshold values.

14. The method of claim 12, wherein making the first comparison by comparing the average energy of the first communication channel during the first time interval to the first energy threshold comprises:
receiving one or more first energy samples from the first communication channel during the first time interval;
determining the average energy of the first communication channel based on the one or more first energy samples; and
comparing the average energy of the first communication channel to the first energy threshold.

15. The method of claim 12, further comprising:
upon determining that the first communication channel is busy:
making an addition comparison by comparing an average energy of the first communication channel during an additional first time interval to the first energy threshold;
determining whether or not the first communication channel is busy based on the additional comparison; and
upon determining that the first communication channel is available for transmission, transmitting data over the first communication channel.

16. A system comprising:
an integrated circuit chip comprising logic configured to:
receive, from a serial peripheral interface bus, an indication to initiate channel assessment;

receive, from the serial peripheral interface bus, a user-selected first set of assessment parameters, the first set of assessment parameters indicative of a first time interval and a first energy threshold;

make a first comparison by comparing an average energy of a first communication channel during the first time interval to the first energy threshold;

determine whether or not the first communication channel is busy based on the first comparison;

replace the first set of assessment parameters with a user-selected second set of assessment parameters, wherein the second set of assessment parameters are received from the serial peripheral interface bus, the second set of assessment parameters indicative of a second time interval and a second energy threshold different than the first time interval and the first energy threshold, respectively;

make a second comparison by comparing an average energy of a second communication channel during the second time interval to the second energy threshold; and determine whether or not the second communication channel is busy based on the second comparison, wherein the first time interval and the first energy threshold correspond to a first communications standard, and wherein the second time interval and the second energy threshold correspond to a second communications standard different than the first communication standard.

17. The system of claim 16, wherein the system further comprises one or more registers configured to store the first set of assessment parameters and the second set of assessment parameters, and wherein the integrated circuit chip further comprises logic to receive the first set of assessment parameters and the second set of assessment parameters from the serial peripheral interface bus through the one or more registers.

18. The system of claim 17, wherein the one or more registers are configured to selectably store any one of a plurality of sets of assessment parameters as the first set of assessment parameters based on input from the serial peripheral interface bus, and store any other one of the plurality of sets of assessment parameters as the second set of assessment parameters based on input from the serial peripheral interface bus, wherein each set of assessment parameters corresponds to a different communications standard.

19. The system of claim 16, wherein the integrated circuit chip includes logic configured to determine that the first communication channel is busy in response to determining that the average energy of the first communication channel exceeds the first energy threshold.

20. The system of claim 16, wherein the integrated circuit includes logic configured to determine that the first communication channel is available for transmission in response to determining that the average energy of the first communication channel does not exceed the first energy threshold.

21. The system of claim 16, wherein the integrated circuit includes logic configured to:

receive one or more first energy samples from the first communication channel during the first time interval;

determine the average energy of the first communication channel based on the one or more first energy samples; and compare the average energy of the first communication channel to the first energy threshold.

22. A transceiver comprising:

a register bank configured to:

store data indicative of an instruction to initiate channel assessment based on input from a serial bus interface;

store a first set of assessment parameters based on input from a serial bus interface, the first set of assessment parameters indicative of a first time interval and a first energy threshold; and replace the first set of assessment parameters with a user-selected second set of assessment parameters based on input from the serial bus interface, the second set of assessment parameters indicative of a second time interval and a second energy threshold;

a radio module; and a baseband module operatively coupled to the register bank and the radio module, wherein the baseband module is configured to:

retrieve the data indicative of the instruction to initiate channel assessment; and responsive to retrieving the data indicative of the instruction to initiate channel assessment:

retrieve the first set of assessment parameters or the second set of assessment parameters from the register bank;

request, from the radio module, one or more energy samples from a communication channel during the first time interval or the second time interval;

determine an average energy of the communication channel based on the one or more energy samples received from the radio module;

compare the average energy of the communication channel to the energy threshold; and determine whether or not the communication channel is busy based on the comparison.

23. A transceiver comprising:

a register bank configured to:

store data indicative of an instruction to initiate channel assessment based on input from a serial bus interface;

store a first set of assessment parameters based on input from a serial bus interface, the first set of assessment parameters indicative of a first time interval and a first energy threshold; and replace the first set of assessment parameters with a user-selected second set of assessment parameters based on input from the serial bus interface, the second set of assessment parameters indicative of a second time interval and a second energy threshold, wherein the first time interval and the first energy threshold correspond to a first communications standard, and wherein the second time interval and the second energy threshold correspond to a second communications standard different than the first communication standard;

a radio module; and a baseband module operatively coupled to the register bank and the radio module, wherein the baseband module is configured to:

retrieve the data indicative of the instruction to initiate channel assessment; and responsive to retrieving the data indicative of the instruction to initiate channel assessment:

retrieve the first set of assessment parameters or the second set of assessment parameters from the register bank;

request, from the radio module, one or more energy measurements of a communication channel based on the first time interval or the second time interval;

determine an average energy of the communication channel based on one or more energy measurements received from the radio module;

compare the average energy of the communication channel to the energy threshold; and determine whether or not the communication channel is busy based on the comparison.

* * * * *